US009754306B2

(12) United States Patent
Brown

(10) Patent No.: US 9,754,306 B2
(45) Date of Patent: Sep. 5, 2017

(54) RECOMMENDATION ENGINE WITH PROFILE ANALYSIS

(71) Applicant: Stephen J. Brown, Woodside, CA (US)

(72) Inventor: Stephen J. Brown, Woodside, CA (US)

(73) Assignee: Invent.ly LLC, Woodside, CA (US)

( * ) Notice: Subject to any disclaimer, the term of this patent is extended or adjusted under 35 U.S.C. 154(b) by 680 days.

(21) Appl. No.: 14/280,547

(22) Filed: May 16, 2014

(65) Prior Publication Data

US 2015/0248721 A1 Sep. 3, 2015

Related U.S. Application Data

(63) Continuation-in-part of application No. 14/195,335, filed on Mar. 3, 2014.

(51) Int. Cl.
*G06F 3/00* (2006.01)
*G06F 13/00* (2006.01)
(Continued)

(52) U.S. Cl.
CPC ......... *G06Q 30/0631* (2013.01); *G06Q 50/01* (2013.01); *H04N 5/44543* (2013.01); *H04N 21/4532* (2013.01)

(58) Field of Classification Search
CPC ............... G06Q 30/02; G06Q 30/0631; G06Q 30/0601; H04N 21/4532; H04N 5/44543;
(Continued)

(56) References Cited

U.S. PATENT DOCUMENTS 6,912,505 B2 * 6/2005 Linden ................... G06Q 30/02
705/14.53
7,794,888 B2 * 9/2010 Yokoyama ........ H01M 8/04231
429/408
(Continued)

FOREIGN PATENT DOCUMENTS

WO 2012051586 A1 4/2012
WO 2013013091 A1 1/2013

OTHER PUBLICATIONS

Madhusudan, A., "Building a Recommendation Engine—Machine Learning Using Windows Azure HDInsight, Hadoop and Mahout," Amazedsaint's Tech Journal, http://www.amazedsaint.com/2013/07/building-simple-recommender-engine.html, Jul. 11, 2013.
(Continued)

*Primary Examiner* — Andrew Joseph Rudy
(74) *Attorney, Agent, or Firm* — Rahman LLC

(57) ABSTRACT

A computer implemented system and method includes a recommendation engine that provides accurate recommendations based on an accurate analysis of the tastes and preferences of a user. The recommendation engine takes into consideration the information corresponding to the tastes and preferences of the users using information gathered from social networking profiles of the user as well as the reviews previously provided by the user. The recommendation engine collaborates this information with the review related information obtained from the reviewers in order to ascertain the recommendations that would match the preferences and tastes of the user.

6 Claims, 7 Drawing Sheets

(51) Int. Cl.
*H04N 5/445* (2011.01)
*G06Q 30/06* (2012.01)
*G06Q 50/00* (2012.01)
*H04N 21/45* (2011.01)

(58) Field of Classification Search
CPC ............ H04N 21/44222; H04N 7/163; H04N 21/482; H04N 21/4622
USPC .................................................... 725/46, 47
See application file for complete search history.

(56) References Cited

U.S. PATENT DOCUMENTS

| | | | |
|---|---|---|---|
| 7,885,902 B1 | 2/2011 | Shoemaker et al. | |
| 7,937,725 B1 | 5/2011 | Schaffer et al. | |
| 8,090,621 B1* | 1/2012 | Chakrabarti | G06Q 30/0601 705/26.1 |
| 8,099,376 B2 | 1/2012 | Serrano-Morales | G06N 5/025 706/47 |
| 8,103,540 B2* | 1/2012 | Gross | G06Q 30/02 705/7.33 |
| 8,108,255 B1* | 1/2012 | Robinson | G06Q 30/02 705/14.44 |
| 8,146,120 B2 | 3/2012 | Frikker et al. | |
| 8,239,287 B1* | 8/2012 | Smith | G06Q 30/0241 705/26.1 |
| 8,326,690 B2* | 12/2012 | Dicker | G06Q 30/02 705/14.54 |
| 8,326,777 B2* | 12/2012 | Zhang | G06N 99/005 706/12 |
| 8,484,048 B2* | 7/2013 | Halsted | G06Q 10/10 235/385 |
| 8,489,515 B2* | 7/2013 | Mathur | G06F 17/30867 705/319 |
| 8,533,052 B1* | 9/2013 | Rajyaguru | G06Q 30/0255 705/26.1 |
| 8,620,906 B2* | 12/2013 | Shen | G06Q 30/0282 704/9 |
| 8,731,995 B2* | 5/2014 | Sun | G06Q 10/10 704/9 |
| 8,768,936 B2* | 7/2014 | Bao | G06F 17/30867 707/749 |
| 9,058,609 B2* | 6/2015 | Trout | G06Q 30/02 |
| 9,104,293 B1* | 8/2015 | Kornfeld | G06F 3/04817 |
| 9,104,718 B1* | 8/2015 | Levy | G06F 17/30867 |
| 9,191,356 B2* | 11/2015 | Ahn | H04L 51/32 |
| 9,262,764 B2* | 2/2016 | Trout | G06Q 10/10 |
| 9,286,391 B1* | 3/2016 | Dykstra | G06F 17/30864 |
| 9,384,501 B2* | 7/2016 | Capuozzo | G06Q 30/0276 |
| 9,390,168 B1* | 7/2016 | Dykstra | G06F 17/30752 |
| 9,443,245 B2* | 9/2016 | Sun | G06Q 30/02 |
| 9,519,684 B2* | 12/2016 | Xu | G06F 17/3053 |
| 9,552,055 B2* | 1/2017 | Li | G06Q 30/0269 |
| 9,552,553 B1* | 1/2017 | Wilson | G06N 99/005 |
| 9,558,242 B2* | 1/2017 | Stuttle | G06F 17/3053 |
| 9,633,388 B2* | 4/2017 | Robinson | G06Q 30/0631 |
| 2005/0222987 A1* | 10/2005 | Vadon | G06F 17/30997 |
| 2011/0016121 A1 | 1/2011 | Sambrani et al. | |
| 2011/0251988 A1 | 10/2011 | Pronk et al. | |
| 2016/0335704 A1* | 11/2016 | Chin | G06Q 30/0631 |

OTHER PUBLICATIONS

Dunning, T., "Machine Learning Applications: Recommendation Engines Using Multiple Behavior Sources," Strata Conference & Hadoop World, http://strataconf.com/stratany2013/public/schedule/detail/30572, Oct. 28, 2013.

Dey, S., "Big Data and Machine Learning: Building a Recommendation Engine," http://www.3pillarglobal.com/blog/big-data-and-machine-learning-building-recommendation-engine, Aug. 5, 2013.

Adomavicius, G., et al., "Multi-Criteria Recommender Systems," Recommender Systems Handbook, Chapter 24, Springer Science + Business Media, LLC, XXIX, pp. 769-803, 2011.

Pappas, N., et al., "Sentiment Analysis of User Comments for One-Class Collaborative Filtering over TED Talks," SIGIR '13 Proceedings of the 36th international ACM SIGIR conference on Research and development in information retrieval, pp. 773-776, 2013.

Pang, B., et al., "Seeing stars: Exploiting class relationships for sentiment categorization with respect to rating scales," Proceedings of the 43rd Annual Meeting of the ACL, pp. 115-124, Ann Arbor, Jun. 2005.

Manouselis, N., et al., "Analysis and Classification of Multi-Criteria Recommender Systems," World Wide Web, Springer, Mar. 27, 2007, 10:415-441.

* cited by examiner

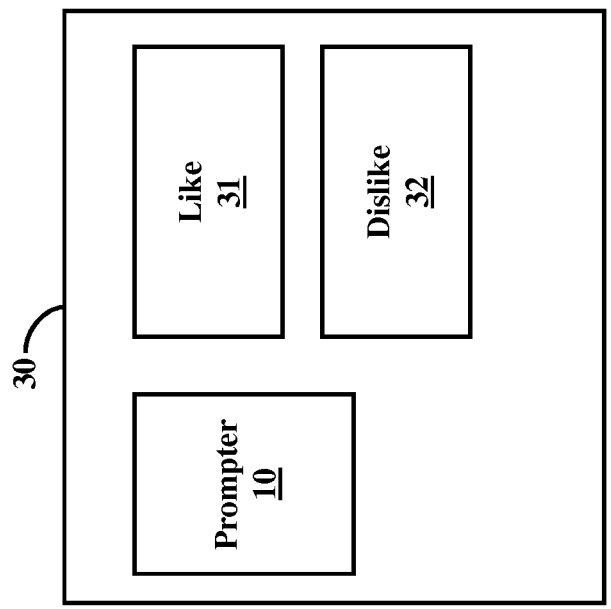

| Item name | User Score (U) | Reviewer 1 | | Reviewer 2 | | Reviewer 3 | | Reviewer n | |
|---|---|---|---|---|---|---|---|---|---|
| | | Review Score (CR) | Weight Score (W) | Review Score (CR) | Weight Score (W) | Review Score (CR) | Weight Score (W) | Review Score (CR) | Weight Score (W) |
| Item 1 | $U_1$ | $CR_{11}$ | $W_{11}$ | $CR_{12}$ | $W_{12}$ | $CR_{13}$ | $W_{13}$ | $CR_{1n}$ | $W_{1n}$ |
| Item 2 | $U_2$ | $CR_{21}$ | $W_{21}$ | $CR_{22}$ | $W_{22}$ | $CR_{23}$ | $W_{23}$ | $CR_{2n}$ | $W_{2n}$ |
| Item 3 | $U_3$ | $CR_{31}$ | $W_{31}$ | $CR_{32}$ | $W_{32}$ | $CR_{33}$ | $W_{33}$ | $CR_{3n}$ | $W_{3n}$ |
| Average weight | | Average weight$_{(1)}$ | | Average weight$_{(2)}$ | | Average weight$_{(3)}$ | | Average weight$_{(n)}$ | |

| Item name | User Score (U) | Reviewer 1 Average weight $WAS_1$ Review Score (CR) | Reviewer 2 Average weight $WAS_2$ Review Score (CR) | Reviewer n Average weight $WAS_n$ Review Score (CR) | Probability Score |
|---|---|---|---|---|---|
| Item 4 | NULL | $CR_{41}$ | $CR_{42}$ | $CR_{4n}$ | $R_4$ |
| Item 5 | NULL | $CR_{51}$ | $CR_{52}$ | $CR_{5n}$ | $R_5$ |
| Item 6 | NULL | $CR_{61}$ | $CR_{62}$ | $CR_{6n}$ | $R_6$ |

RECOMMENDATION ENGINE WITH PROFILE ANALYSIS

CROSS-REFERENCE TO RELATED APPLICATIONS

This application is a continuation-in-part of U.S. patent application Ser. No. 14/195,335 filed on Mar. 3, 2014 and entitled "Recommendation Engine," the complete disclosure of which, in its entirety, is herein incorporated by reference.

BACKGROUND

Technical Field

The embodiments herein relate to the field of information systems, and more particularly to recommendation engines that generate recommendations based at least partially on the social networking profiles of users.

Description of the Related Art

With the advent of the information age, people, especially internet users are provided with access to enormous volumes of information. The availability of enormous amounts of information not only provides a user with much needed information, but also increases the difficulty linked with identifying and analyzing the right set of information. Such a phenomenon wherein information is available aplenty but right information is not readily accessible is referred to as information overload.

Use of recommendation engines is one of the solutions for overcoming the drawbacks associated with information overload. A recommendation engine typically generates and provides personalized recommendations to a user. A recommendation engine assists users in finding relevant results in a personalized manner; i.e., based on a user's personal choices and preferences.

One of the preferred methods of generating recommendations is the statistical method, wherein behavioral aspects of a user and the statistics thereof are analyzed in detail and subsequently correlated to generate a recommendation. Conventional recommendation engines typically employ the statistical method and typically elicit information encompassing wide spectrums, analyzing which can indeed be overwhelming for a user. Furthermore, conventional recommendation engines typically employ statistical methods to calculate scale factors to generate prediction models based on regression analyses. Such prediction models typically work only if an adequate amount of training data/data clusters is/are available for the prediction model. However, in case of certain product/service related recommendations, the available data can lack the density, which renders them unsuitable for further utilization in a regression analysis based prediction model. Such a phenomenon is typically referred to as a 'sparse data problem'. The 'sparse data problem' renders a regression based prediction model to generate simplistic results such as, for example, 'if a user likes product 'A', he would also like product 'B' which is in the same category as 'A'. However, the 'sparse data problem' can be overcome by eliciting additional information (including tastes related information, preferences related information) from the user at the time of generating recommendations. However, the utilization of such a phenomenon may complicate the process of generating recommendations by overly emphasizing the need for prompting the user to manually provide the information necessary for generating recommendations.

Due to the presence of information covering much wider spectrum than required by the user, the vital information that was actually searched for could end up getting ignored. However, if the user is diligent, he may try and go through the available information and attempt to find out the necessary information. However, such a search would often be time consuming and may not result in an optimum result set. Often, the user would have to settle for less relevant information instead of taking into consideration all the available and presented information.

The disadvantages of 'information overload', 'sparse data problem', and 'lack of recommendations' is true for electronic media such as movies, wherein at least several hundreds of movies are made available for public viewing every week. Typically, recommendation engines generate movie recommendations by analyzing users' behavior which is presumed typically based on the keywords/reviews/opinions provided by the user. A conventional recommendation engine typically takes into consideration the genre related information linked with the movie logs, which were previously accessed by the user, to generate futuristic movie recommendations.

One of the drawbacks associated with conventional recommendation engines is that they can generate a movie recommendation corresponding to a user, only after sufficient keywords and movie genre related information have been acquired from the user. To overcome the aforementioned drawback, some of the conventional recommendation engines attempted to generate movie recommendations despite the absence of operational logs (keywords and movie genre related information) by utilizing the movie related trends retrieved from the data corresponding to other like-minded users (who could be connected to the user in question, on a social networking website). However, the quality of such recommendations were compromised given the fact that the movies were recommended solely based on the movie tastes related data gathered from people who were perceived to be having same tastes as that of the user in question, since they were connected with the user (in question), in one way or the other. Moreover, some of the conventional recommendation engines were solely completely upon availability of sufficient operational logs (of the users) in order to be able to begin generating near accurate recommendations corresponding to the movies.

Furthermore, some of the conventional recommendation engines made use of the user-user distance algorithm to provide recommendations to users. The user-user algorithm calculates the distance between the users, taking into consideration the ratings provided by the respective users in respect of a particular entity. For example, if user 'A' and user 'B' have provided a five star rating to a particular movie, then the distance between them is zero, and both the users ('A' and 'B') are presumed to be having similar tastes and preferences. Some of the conventional recommendation engines indeed use the distance between the individual users to generate recommendations. However, accurately computing the distances between users is generally always a tedious task given the possibility of the existence of minimal common traits. Moreover, in case of movies, the ratings provided by users would typically relate to those movies which have performed positively in terms of revenue generation and viewers' response. Therefore, generating a recommendation involving a movie which has not been termed as a blockbuster is difficult, owing to the lack of user ratings, which in turn affects the effective implementation of the user-user distance algorithm. Moreover, conventional recommendation engines were expected to generate recommendations on the fly, and utilization of a user-user distance algorithm, which involved determining the common traits amongst the users and analyzing the distance between the users, to generate recommendations, was a time consuming task in terms of information analysis and result generation, given the fact that determining common traits involved analysis of large number of user attributes.

Therefore, there was felt a need for a computer implemented system which could accurately and swiftly generate recommendations, for example, movie recommendations, based on the careful scrutiny of tastes of individual users. There was also felt a need for a system which could generate effective and accurate recommendations despite the absence of operational logs (of users). There was also felt a need for a system that is capable of accurately correlating a user's tastes and preferences with any existing reviews/operational logs, and recommend an item to the user based on the aforementioned correlation. There was also felt a need for a computer implemented system which encompassed a low turnaround time in terms of generating accurate recommendations. There was also felt a need for a system that would take into consideration the tastes, preferences and activities of a user, gathered by analyzing the user's social networking website profile (in addition to gathering a user's tastes and preferences through the existing reviews of the user), while generating a recommendation.

SUMMARY

In view of the foregoing, an embodiment herein provides a computer implemented system for generating recommendations corresponding to a plurality of items, the system comprising: a prompter accessible to a first user, wherein the prompter prompts the first user to input social network profile information of the first user, and wherein the prompter prompts the first user to input at least one item name for an item and assign a user score to said item; a first search module operatively connected to the prompter, wherein the first search module searches for and elicits a first group of at least one review score generated by respective reviewers and corresponding to the item reviewed by the first user, and wherein the first search module searches for and elicits a second group of at least one review score generated only by at least one reviewer who generated the first group of at least one review score; a processor operatively connected to the first search module, wherein the processor calculates a plurality of weight scores based on the user score and the first group of at least one review score, wherein the processor assigns said plurality of weight scores to the respective reviewers, and calculates an average weight corresponding to each of the respective reviewers, and wherein the processor calculates probability scores corresponding to each item linked to the second group of at least one review score; a recommendation engine operatively connected to the processor, said recommendation engine comprising: a generator that generates a list of recommendations comprising the at least one item name linked to the second group of at least one review score, wherein the list is generated based on at least the probability scores corresponding to each of item linked to the second group of at least one review score, wherein the generator provides the first user with access to the list of recommendations for review of items thereof, and wherein the generator iteratively regenerates the list of recommendations to include only names of the items yet to be reviewed by the first user and linked to said second group of at least one review score; and an updating module operatively connected said generator, wherein the updating module updates at least the social network profile information of the first user with information corresponding to items reviewed by the first user; a clustering module operatively connected to the prompter, wherein the clustering module has access to respective social networking profiles of a plurality of users, the respective social networking profiles being updated by the updating module, and wherein the clustering module segregates the respective social networking profiles of the plurality of users into a plurality of clusters based on at least a taste and preference elicited from the respective social networking profiles; and a second search module operatively connected and cooperating with the clustering module for accessing each of the plurality of clusters, wherein the second search module searches for and identifies the at least one item name and corresponding user scores available in at least one cluster common to at least one of the plurality of users and said the user, and wherein said search module instructs the generator to iteratively regenerate the list of recommendations to include names of items identified by the second search module.

The prompter may prompt the first user to input social network information of the first user including a user name and password for a respective social networking profile. The processor may calculate the plurality of weight scores using a function of squares of difference between each of the at least one review score in the first group and the user score. The prompter may instruct the generator to iteratively regenerate the list of recommendations by eliminating from the list of recommendations at least one item that is selected for review by the first user. The clustering module may group the respective social networking profiles of the plurality of users into the plurality of clusters based on interests of the first user and demographic information corresponding to the first user. The probability scores calculated by the processor may be indicative of a probability of said first user preferring each item present in the second group, and wherein the probability scores are functions of respective the at least one review score present in the second group and an average weight for the respective reviewers.

Another embodiment herein provides a computer implemented method for generating recommendations corresponding to a plurality of items, and a non-transitory program storage device readable by computer, and comprising a program of instructions executable by the computer to perform a method for generating recommendations corresponding to a plurality of items. The method comprises: prompting a first user to input social networking profile information of the first user; prompting the first user to input at least one item name; prompting the first user to review an item corresponding to the input item name; assigning a user score to the item; searching for and eliciting a first group of at least one review score, wherein the first group of at least one review score corresponds to the item reviewed by the first user; searching for and eliciting a second group of at least one review score, wherein the second group of at least one review score is linked to respective items and is generated only by at least one reviewer who generated the first group of at least one review score; calculating weight scores corresponding to a combination of a user score and each of the at least one review score present in the first group; assigning the weight scores to respective reviewers; calculating an average weight corresponding to each reviewer; calculating probability scores for each of the second group of at least one review score; generating a list of recommendations having items linked to the second group of at least one review score, wherein the list of recommendations is generated based on at least the probability scores corresponding to each of the items linked to the second group of at least one review score; providing the first user with access to the list for review of the items thereof; updating said social networking profile information with information corresponding to the items reviewed by the first user; accessing the updated social networking profile information of a plurality of users; segregating the social networking profile information into a plurality of clusters based on at least a taste and preference elicited from respective social networking profiles; accessing each of the plurality of clusters; searching for and identifying item names and corresponding user scores available in at least one cluster common to at least one of the plurality of users and the first user; iteratively regenerating the list of recommendations to include names of the items identified from the at least one cluster; and providing the user with access to the regenerated list.

Prompting a user to input social networking profile information of the first user may comprise prompting the first user to enter at least a username and a password. Calculating the weight scores may comprise calculating the weight scores using a function of squares of difference between each of the at least one review score in the first group and the user score. The method may further comprise grouping the social networking profile information of the plurality of users into different clusters based on at least the interests of users, demographic information corresponding to the users, and tastes and preferences of the users. Searching for and eliciting the items appropriate for the first user based on an analysis of the social networking profile information may further comprise searching for and eliciting the items corresponding to interests of the first user, demographic information of the first user, and tastes and preferences of the first user. The probability scores may be indicative of a probability of the first user preferring each item present in the second group. The probability scores may be functions of respective the at least one review score present in the second group and an average weight for said respective reviewers.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1B is block diagram of a user interface in accordance with an embodiment herein;

FIG. 1C is a matrix for calculating the average weight for each of the reviewers in accordance with an embodiment herein;

FIG. 1D is a matrix for calculating the probability score with respect to the second group of review scores in accordance with an embodiment herein;

DETAILED DESCRIPTION

Figure 1A:
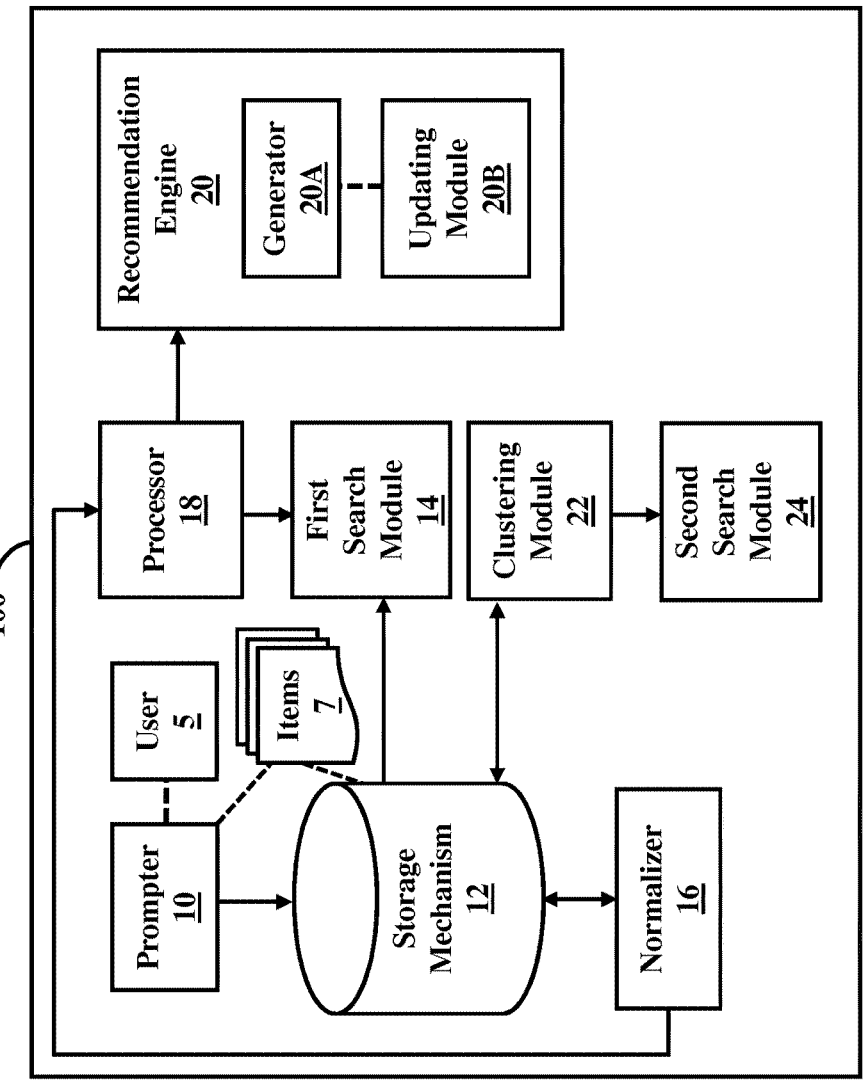
FIG. 1A is a system level block diagram illustrating the functional blocks of the computer implemented system for recommending at least one item to a user, in accordance with a first embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1A through 4, where similar reference characters denote corresponding features consistently throughout the figures, there are shown preferred embodiments.

Generating accurate recommendations, in-line with the preferences of a user is a daunting task. An effective recommendation engine should be able to generate accurate recommendations that closely correspond to the preferences and tastes of the user. Moreover, accurately determining the tastes and preference of the user utilizing the available information is also a cumbersome task given the availability of voluminous information. The availability of voluminous information necessitates utilization of accurate data processing and analysis capabilities.

One of the methods utilized by conventional recommendation engines was to compute an intangible distance between users, by the way of determining the preferences and tastes common to those users. Subsequently, the recommendation engine would generate recommendations based on the distance between the users. For example, if both user 'A' and user 'B' were to like a particular cuisine in a restaurant, then the distance between them in respect of that particular cuisine would be zero, and the recommendation engine, using this information would generate appropriate recommendations (wherein the recommendations would be similar to the cuisine liked by users 'A' and 'B') and provide them to either user 'A' or user 'B', depending upon who requests for a recommendation. However, the methodology utilized by the conventional recommendation engines is not exact and without errors given the fact that there could exist very few or no commonalities between the users. Providing a conventional regression based prediction model with sparse information (NULL value attributes such as distance variables having a ZERO value) typically results in generating inaccurate recommendations. Further, the efficiency of the conventional recommendation engines is affected when there are no commonalities between the users. Owing to the lack of efficiency, conventional recommendation engines end up generating inaccurate recommendations, or recommendations which are not in-line with the tastes and preferences of the users.

Therefore, there was felt a need for a recommendation engine that provides accurate recommendations based on an accurate analysis of the tastes and preferences of the user. The recommendation engine provided by the embodiments herein takes into consideration the information corresponding to the tastes and preferences of the users (information gathered from social networking profiles of the user as well as the reviews previously provided by the user) and collaborates this information with the review related information obtained from the reviewers, to ascertain the recommendations that would match the preferences and tastes of the user.

By employing the aforementioned mechanism, the recommendation engine provided by the embodiments herein performs an accurate mapping of the tastes and preferences of users and the reviewers. The recommendation engine works on the phenomenon that a user is more likely to accept a review from a reviewer whose tastes and preferences match with that of the user. For example, if a user 'A' prefers romantic movies, then it is highly likely that he would accept the reviews generated by a reviewer who is a connoisseur of romantic movies. Therefore, the recommendation engine generates recommendations in a manner wherein a user is recommended only those items which have been previously reviewed by reviewers having tastes and preferences similar to that of the user.

Further, by collaborating the user's tastes and preference related information with the review related information the recommendation engine obviates the need for employing the user-user distance algorithm, which may provide inaccurate results when no information corresponding to the distance between the users is available.

The recommendation engine obviates the need for comparing the tastes and preference related information elicited from different users, and generating recommendations based on the analysis of the resultant of aforementioned comparison. On the contrary, relying on the comparison of the tastes and preferences of users amongst one another would have rendered the recommendation engine ineffective, in the event of availability of limited number of users, since there would be minimal information available for analysis and determination of distance between the users.

Furthermore, given the comparison between the 'tastes & preference related information' of the users (obtained from the reviews provided by the users and from the social networking profiles of users) and the 'review related information' (obtained from the reviewers), the recommendation engine also obviates the need for availability of common traits and preferences amongst the users, the absence of which would have rendered a conventional recommendation engine using the user-user distance algorithm, ineffective. The capabilities and functionalities of the recommendation engine are not affected by the number of users available, nor are they affected by the absence/scarcity of common tastes and preferences amongst the users.

FIG. 1A illustrates a first embodiment herein which is directed to a computer implemented system 100 for recommending at least one item to a user 5. The term 'user' as used throughout this specification refers to the people making use of the system 100. A prompter 10 is configured to prompt the user 5 to enter an item name. The term 'item' used herein includes any tradable products or services including but is not restricted to movies, music compilations, books, restaurants, tourist places, services including land/air/sea transportation, and theatre events.

In accordance with the first embodiment, the prompter 10 is configured to prompt the user 5 to key-in an item name. The prompter 10 is typically equipped with auto filling-in capabilities, use of which automatically completes the name of the item. Alternatively, the prompter 10 can also provide the user 5 with a pre-generated list, typically a drop down list of items 7, which includes the names of the items 7 which closely correspond to the letters keyed in by the user 5, thereby enabling the user 5 to select the item from the pre-generated list of items 7 rather than manually entering the entire name of the item. The drop down list of items 7 is populated automatically by the prompter 10 based on the keystrokes entered by the user 5. The list of items 7 is dynamically updated based on the keystrokes of the user 5. Alternatively, the drop down list of items 7 can also be pre-generated and could include a listing of most popular items which are frequently searched for, by other users of the system 100.

In accordance with the first embodiment, the prompter 10 gathers information about the preferences and tastes of the user 5. Whenever the user 5 inputs an item name, subsequent to a prompt from the prompter 10, the item name input by the user 5 is stored in the storage mechanism 12. Subsequently, the prompter 10 prompts the user 5 to review the item. The prompter 10 prompts the user 5 to specify whether he liked the item or otherwise (disliked the item). The user 5 can specify his liking or dislike for the input item name by clicking either of the 'Like' button 31 or 'dislike' button 32, which are displayed on a user interface 30, as shown in FIG. 1B (with reference to FIG. 1A), which provides users with access to the system 100.

Alternatively, two radio buttons, one for expressing 'liking' and another for expressing 'dislike', towards an item, can also be displayed on the user interface. Alternatively, a drop down list involving two options namely 'like' and 'dislike' having the same functionalities as mentioned above, can also be employed. It is within the scope of the embodiments disclosed herein, to employ any possible computer implemented methods for determining whether the user 5 liked a particular item or otherwise. For example, the user 5 could also be posed a question such as "did you like this item" and could be prompted to either click on a button reading 'yes' or a button reading 'no'. However, any subtle variations such as replacing the terms 'like' and 'dislike' with terms 'loved it/hated it', 'yes/no', 'recommend/don't recommend', and the like fall within the purview of the embodiments disclosed herein. Subsequently, the item name input by the user 5 and the corresponding user score provided by the user 5 by means of either clicking the 'like' button 31 or the 'dislike' button 32 are stored in the storage mechanism 12.

In accordance with the embodiments herein, the prompter 10 is further configured to prompt the user 5 to input his social networking profile information including at least the 'username' and the 'password'. The prompter 10 typically accesses the social networking profile of the user via the 'username' and 'password' input by the user, and extracts the profile information including but not restricted to the demographic information corresponding to the user 5 and the information corresponding to the tastes and preferences of the user 5. The demographic information of user 5 includes at least the age, gender, location, languages known, and ownership information (ownership of car, home and the like). The information corresponding to the tastes and preferences is elicited by the prompter 10 depending upon at least the items/elements liked by the user 5 on the social networking website, the items/elements disliked/reported as spam by the user 5, the items/elements recommended by the user 5 to acquaintances on a social networking platform, the items/elements frequently viewed by the user 5 on the social networking platform. The aforementioned information elicited by the prompter 10 is preferably stored in the storage mechanism 12, for later retrieval/extraction.

In accordance with the first embodiment, the system 100 further includes a search engine (e.g., first search module) 14. The search engine 14 receives the item name entered/selected/input by the user 5 and initiates a search across the storage mechanism 12 and optionally across predetermined third party data stores (including but not restricted to web servers storing information corresponding to the available products/services) to search for and elicit at least the review scores corresponding to the item name keyed in by the user 5. The search engine 14 performs a combination of pattern matching and one-to-one mapping to elicit the review scores corresponding to the item name keyed in by the user 5. The search engine categorizes the elicited review scores into a first group of review scores. The first group of review scores includes review scores that correspond to the 'item name' keyed in by the user 5. Each of the review scores in the first group of review scores are further linked to respective reviewers (who generated those reviews).

In accordance with the first embodiment, the search engine 14 further searches for the other (remaining) reviews and the review scores generated by the reviewers who also generated the first group of review scores. The search engine 14, in this case, implements a second mapping function, using which it maps the reviewers linked with the first set of review scores to all the other reviews generated by each those reviewers. These reviews form a second set of review scores. The second set of review scores includes all those review scores generated by only those reviewers who generated the first set of review scores. As is apparent from the aforementioned statement, the reviewers are in common in case of both the first set of review scores and the second set of review scores. The first set of review scores correspond to the item name entered by the user 5, whereas the second set of review scores correspond to the items which were not keyed in by the user 5 during that particular iteration, but generated by the same reviewers who generated the first set of review scores.

In accordance with the first embodiment, the review score could be arranged in terms of any numerical scale, for example ranging from '−10 to 10' or '−5 to 5' or '0 to 5' and '0 to 10', but with the understanding that the scores on the lower end of the rating scale (scores up to 4 on a scale of 10 for example) correspond to a negative review and that the scores on the upper end of the rating scale (scores in excess of 5 on a scale of 10) correspond to a positive review. The middle level score; i.e., score 5 in this case, corresponds to a neutral/average review score. The same numerical scale is also applicable for user scores. Further, both the first set of review scores and the second set of review scores are normalized using a normalizer 16. The normalizer 16 adjusts the first and second set of review scores to a per-determined scale wherein −1 corresponds to a negative review, 0 corresponds to a neutral review and +1 corresponds to a positive review. The detailed methodology of normalizing the values, which is a well-known feature, has been omitted for the sake of brevity. Furthermore, it is within the scope of the embodiments herein to normalize and adjust the scores using any of the other statistical techniques. The system 100 further comprises a processor denoted by the reference numeral 18. The processor 18 receives from the normalizer 16, the normalized first set and normalized second set of review scores. The processor 18 calculates the numerical difference between the 'user score' generated by the user 5 and each of the first set review scores generated by respective reviewers, for the item under consideration (i.e., the item selected by the user for review). The numerical difference between the user score and each of the respective review scores (first group of review scores) is construed to be the distance (in terms of the opinion about the item under consideration) between the user 5 and the respective reviewer.

Subsequently, the processor 18 calculates a difference between the predetermined 'maximum possible distance' and the absolute value of the difference between the user score and each of the review scores (first group) for the item under consideration, and subsequently squares up the resultant, to obtain a weight score. The weight score is subsequently assigned to the reviewer, with reference to the item under consideration. FIG. 1C, with reference to FIGS. 1A and 1B, denotes the matrix 40 generated by the system 100 of the embodiments herein for calculating the average weight corresponding to each of the reviewers.

As illustrated in FIG. 1C, item 1, item 2, and item 3 are the items 7 specified by the user 5 through the prompter 10. Subsequently, the user 5 assigns 'user scores' $U_1$, $U_2$, and $U_3$. The aforementioned information is stored in the storage mechanism 12. Subsequently, the search engine 14 searches for the reviews (from reviewers) corresponding to the items 7 specified by the user 5 (items 1, 2, and 3) and accordingly updates the matrix 40. Referring to FIG. 1C, 'first group of review scores' that includes $CR_{11}$, $CR_{21}$, and $CR_{31}$ is generated by reviewer 1 for item 1, item 2, and item 3 respectively. Further, the 'first group of review scores' includes the review scores $CR_{12}$, $CR_{22}$, and $CR_{32}$ which are generated by reviewer 2 for item 1, item 2, and item 3 respectively. The 'first group of review scores' further includes review scores $CR_{13}$, $CR_{23}$, and $CR_{33}$ which are specified by reviewer 3 respectively for item 1, item 2, and item 3.

Further, the processor 18 calculates the weight scores for every reviewer-user pair. Referring to FIG. 1C horizontally, the first three reviewer-item-user pairs include 'user-item1-reviewer1'; 'user-item2-reviewer1'; 'user-item3-reviewer1'. The next three pairs correspond to review 2 and so on. For example, weight score $W_{11}$ corresponds to item 1 and reviewer 1, whereas $W_{12}$ corresponds to item 1 and reviewer 2, and $W_{13}$ corresponds to item 1 and reviewer 3. The weight score for every item-reviewer-user pair is calculated by the rule $W_{nm}=(2-|CR_{nm}-U_n|)^2$. That is, to calculate $W_{11}$, the following rule will be utilized: $W_{11}=(2-|CR_{11}-U_1|)^2$. Similarly, to calculate $W_{12}$, the rule $W_{12}=(2-|CR_{12}-U_1|)^2$ would be utilized. Here, '2' is the maximum possible distance between the user 5 and a reviewer. Subsequently, the processor 18 calculates the weigh scores (W) and updates the respective weight score fields of the matrix. Subsequently, the processor 18 calculates the cumulative weight; i.e., the average weight for each of the reviewers by utilizing the rule 'average weight$_{(n)}$=average $(W_{nm})$'; i.e., for reviewer 1, the average weight would be average weight$_{(1)}$=average $(W_{11}, W_{21}, W_{31})$; for reviewer 2, the average weight would be average weight$_{(2)}$=average $(W_{12}, W_{22}, W_{32})$ and likewise.

The calculation of weigh scores involves analysis of a particular user-item-reviewer pair, in consideration of the distance between the user 5 and reviewer in terms of the opinion about the item. According to the first embodiment, the reviewer having the highest average weight, in this case, either the reviewer having the score average weight$_{(1)}$ or the reviewer having the score average weight$_{(2)}$ or the reviewer having the score average weight$_{(3)}$ (depending upon whether average weight$_{(1)}$ is the highest or average weight$_{(2)}$ is the highest or average weight$_{(3)}$ is the highest), is deemed to have maximum impact on the thought process of the user 5, and the reviews by that particular reviewer would logically be given the highest priority and importance, when it comes to generating recommendations for the user 5.

In accordance with the first embodiment, every item name (alternatively represented by an item identifier) input by the user 5 through the prompter 10 would be assigned a user score (−1 if the user dislikes the item; 0 if the user has a neutral opinion; and +1 if the user likes the item). Subsequently, the search engine 14 searches the storage mechanism 12 for the reviews corresponding to the item (item name) keyed in by the user 5. Subsequent to the relevant reviews being elicited by the search engine 14, the system 100 extracts at least the names of the reviewers who generated the respective reviews (reviews relating to the item name/item identifier specified by the user 5), and the corresponding review scores. These review scores are characterized as first group of review scores. In accordance with the embodiments herein, the first group of review scores include those review scores which correspond to the reviews (generated by various reviewers) of the item which was specified by the user 5 through prompter 10.

Subsequently, the first group of review scores are normalized by the normalizer 16 to the scale of −1 if the reviewer dislikes the item; 0 if the reviewer has a neutral opinion; and +1 if the reviewer likes the item. Subsequently, the processor 18 computes a weight score for the user-item-reviewer link. Subsequently the processor 18 calculates, for every reviewer, an average weight. The average weight for a reviewer is the average of all the weight scores assigned to the reviewer in respect of all the items which are specified by the user 5. Subsequently, the processor 18 arranges the user-item-reviewer pairs in the decreasing order of average weights, thereby ensuring that the closest user-item-reviewer link is the link having the highest average weight, and the most distant user-item-reviewer link is the link having the lowest average weight. A higher average weight (for a particular reviewer) indicates that the user 5 and the corresponding reviewer possess similar opinions, in terms of the item(s) specified by the user 5. Subsequently, a lower average weight (for a particular reviewer) indicates that the user 5 and the corresponding reviewer do not possess similar opinions, in terms of the item(s) specified by the user 5. Therefore, when generating recommendations for a user 5 based on the available reviews and average weights, it is evident that the reviewer having a higher average weight should be given the priority considering the fact that the user 5 and the reviewer would share similar opinions in respect of a given item and therefore there exists a possibility that the user 5 and the reviewer would have common tastes and preferences.

The average weights (generated at least partially on the basis of the first set of review scores, and subsequently assigned to the respective reviewers) indicate the probability that the user 5 and a reviewer are in-sync with respect to the opinion about a particular item. That is, a higher average weight (for a particular reviewer) indicates that the user 5 and the corresponding reviewer possess similar opinions, in terms of the item(s) specified by the user 5. Subsequently, a lower average weight (for a particular reviewer) indicates that the user 5 and the corresponding reviewer do not possess similar opinions, in terms of the item(s) specified by the user 5.

Subsequently, the system 100 instructs the search engine 14 to elicit the second group of review scores. The search engine 14 searches the storage mechanism 12 for the all the other remaining reviews scores (other than the ones belonging to the first group of review scores) which are generated by only those reviewers who generated the first set of review scores and characterizes them as the second set of review scores. The second set of review scores are elicited based on the phenomenon that since they correspond to only those reviewers who have already been assigned an average weight, there exists a possibility that the user 5 may like the items linked to the second set of review scores, since it could have been reviewed by a like-minded reviewer.

In accordance with the first embodiment, the processor 18 further calculates a probability score indicative of the probability that a user 5 may like a particular item. Only those item names/item identifiers which are linked to the second group of review scores are considered. The processor 18, for every review score present in the second group, takes into consideration the respective average weight assigned to each of the reviewers and multiplies the same with the corresponding review score, to arrive at a final score. Subsequently, the processor 18 computes an average of the final score and determines the probability score corresponding to a particular item that has been linked to a review score present in the second group of review scores. FIG. 1D, with reference to FIGS. 1A through 1C, illustrates a matrix 45 for calculating a probability score in respect of the second set of review scores.

As shown in FIG. 1D; item 4, item 5, and item 6 are the items which have been reviewed by the same reviewers who also reviewed the items specified previously by the user 5; i.e., item 1, item 2, and item 3 (as illustrated in FIG. 1D). It is to be noted that items 4-6 do not have a user score since they have not been specified by the user 5. Items 4-6 are linked to the second group of review scores. In accordance with the first embodiment, the processor 18 calculates a probability that the user 5 prefers either of item 4, item 5, and item 6. The processor 18 takes only the aforementioned items into consideration since these items have been reviewed by those reviewers who also reviewed the items previously specified by the user 5. It is to be noted that these items are not linked to a user score since these items have not been reviewed by the users but only by the reviewer(s). The average weights (corresponding to reviewers of items 4, 5, and 6) are extracted from FIG. 1C by the processor 18. The average weights extracted were previously assigned by the processor 18 as depicted in FIG. 1C. The average weights allocated to each of the reviewers indicates the proximity between the user 5 and the respective reviewers in terms of the opinion about the items. The processor 18, as illustrated in FIG. 1D, calculates the probability score corresponding to the probability that a user 5 would prefer a particular item which has been reviewed by a particular reviewer. To calculate $R_4$; i.e., the probability that the user 5 would prefer item 4, the processor 18 makes use of the rule $R_4$=average $(WAS_1 * CR_{41}, WAS_2 * CR_{42}, \ldots WAS_n * CR_{4n})$ to determine the probability that the user 5 would prefer the item 4. Simultaneously, the processor 18 calculates the probability scores for item 5 and item 6, using the aforementioned methodology, and accordingly updates the matrix 45.

In accordance with the first embodiment, the system 100 further includes a recommendation engine 20 cooperating with the processor 18. The recommendation engine includes a generator 20A configured to generate a list comprising, preferably a rank ordered list comprising the items linked to the second group of review scores (in this case, item 4, item 5, and item 6) preferably being arranged based on the corresponding probability scores. The recommendation engine 20 further comprises an updating module 20B that tracks whether the user 5 reviews the items presented to him by the recommendation engine 20 (in this case, the recommendation engine 20 presents item 4, item 5, and item 6; and the user 5 is prompted to review at least one of the presented items), and accordingly updates at least one social networking profile of the user 5 with the information corresponding to the review (of the item) provided by the user. Therefore, typically, the social networking profile of the user 5 would include updated information corresponding to the items reviewed by the user 5. The information available in the updated social networking profile (of the user 5) includes but is not restricted to name of the reviewed item, the score allotted (by the user 5) to the review item, and information for identifying the reviewed item which includes the genre of the item, the nature of the item (for example, a product or a service), the original creator/owner of the item, the location/place where the item is available, the distributor/publisher of the item, and the like.

In accordance with the first embodiment, the system 100 further comprises a clustering module 22. The clustering module 22 accesses the social networking profiles of all those users, who have accessed and reviewed the items being provided to them in the form of the list, by the recommendation engine 20. As is the case, the first user is also one of the users who has been provided with recommendations by the recommendation engine 20. The clustering module 22 further elicits the information (from the social networking profiles of all the users, including the first user) corresponding to the reviews generated by respective users. As explained earlier, the information elicited by the clustering module 22 includes the name of the reviewed item, the score allotted (by the user 5) to the review item, and information for identifying the reviewed item which includes the genre of the item, the nature of the item (for example, a product or a service), the original creator/owner of the item, the location/place where the item is available, the distributor/publisher of the item, and the like. Further, the clustering module 22 segregates each of the social networking profiles into different clusters based on the information extracted from each of those profiles. Typically, the profiles which incorporate similar reviews (the similarity being decided based on the information extracted from the social networking profiles); i.e., similar reviews in terms of the genre/category of the item being reviewed, the original creator/owner of the reviewed item, the distributor/publisher of the item, the place where the item is available and the like, are taken into consideration, and subsequently the social networking profiles having similar reviews are grouped into a cluster. Likewise, depending upon the similarities between the profiles, several clusters can be created by the clustering module 22. For example, a first cluster can include all the profiles that incorporate reviews corresponding to a particular product, and a second cluster can include all the profiles that incorporate reviews corresponding to a particular owner/creator, and the like.

As is the case, the social networking profile of the first user 5 is also segregated into a cluster, along with the profiles (of other users) which are deemed to be similar to the social networking profile of the first user 5, in terms of at least one of the genre of the item, the score allotted to the item, the nature of the item, the original creator/owner of the item, the location/place where the item is available, the distributor/publisher of the item. However, the similarity between the profiles need not be determined solely based on the here mentioned factors, and can be extended to other similar factors.

The system 100, in accordance with the first embodiment further comprises a second search module 24. The second search module 24 cooperates with the clustering module 22, to access the clusters generated by the clustering module 22. The second search module 24 searches at least the cluster which comprises the profile of user 5. The second search module 24 searches those profiles which are in the same cluster as that of user 5, and subsequently elicits the 'item reviews' incorporated in those profiles. Further, the second search module 24 instructs the generator 20A to regenerate the list incorporating the item names corresponding to the 'item reviews' elicited by the search module 24. The generator 20A provides the regenerated list to the user 5 for the review of items thereof. Subsequently, the item reviewed by the user 5 is removed from the list, and the social networking profile of the user 5 is updated with information corresponding to the review generated by the user 5.

In accordance with the first embodiment, the list of recommendations provided to the user 5 is periodically updated to include recommendations that closely match the user's tastes and preferences, as explained in the aforementioned paragraphs, thereby providing recommendations that are highly relevant and acceptable to the user 5.

Figure 2:
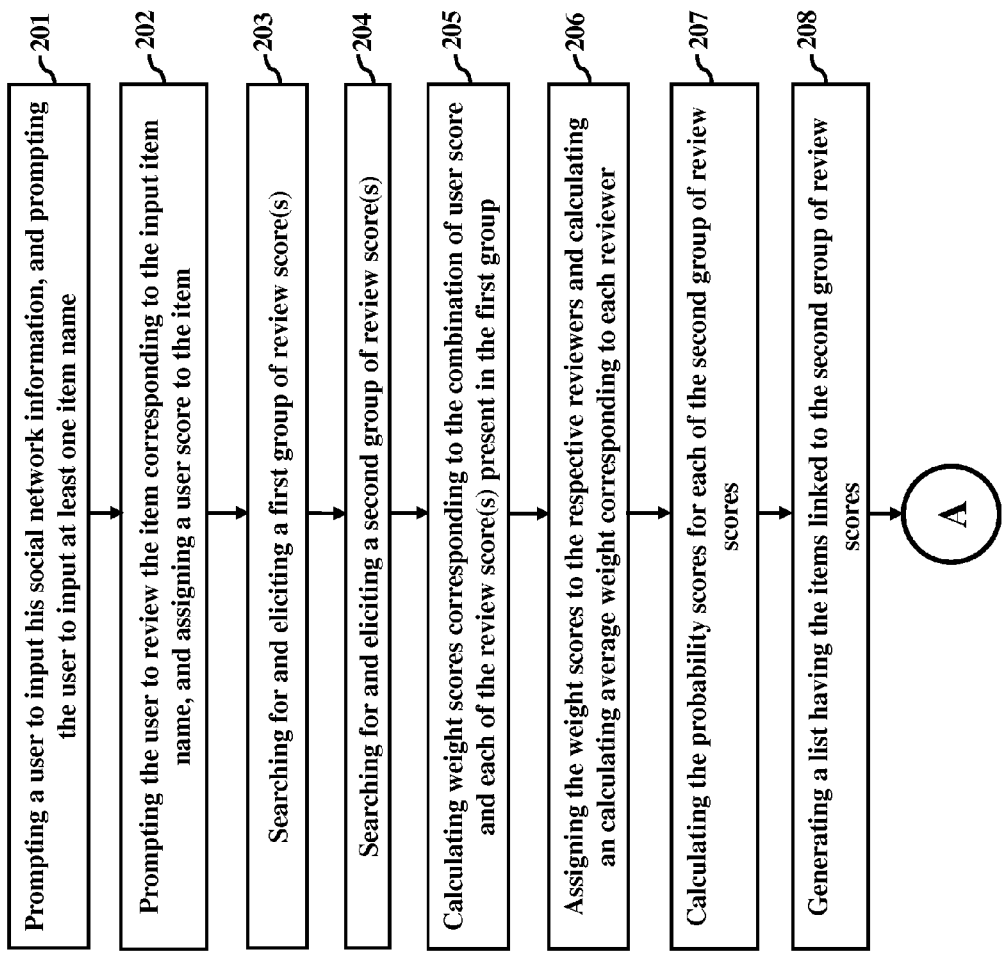
FIG. 2 is a flow diagram illustrating the steps involved in a computer implemented method for recommending at least one item to a user, in accordance with a second embodiment herein.
Figure 3:
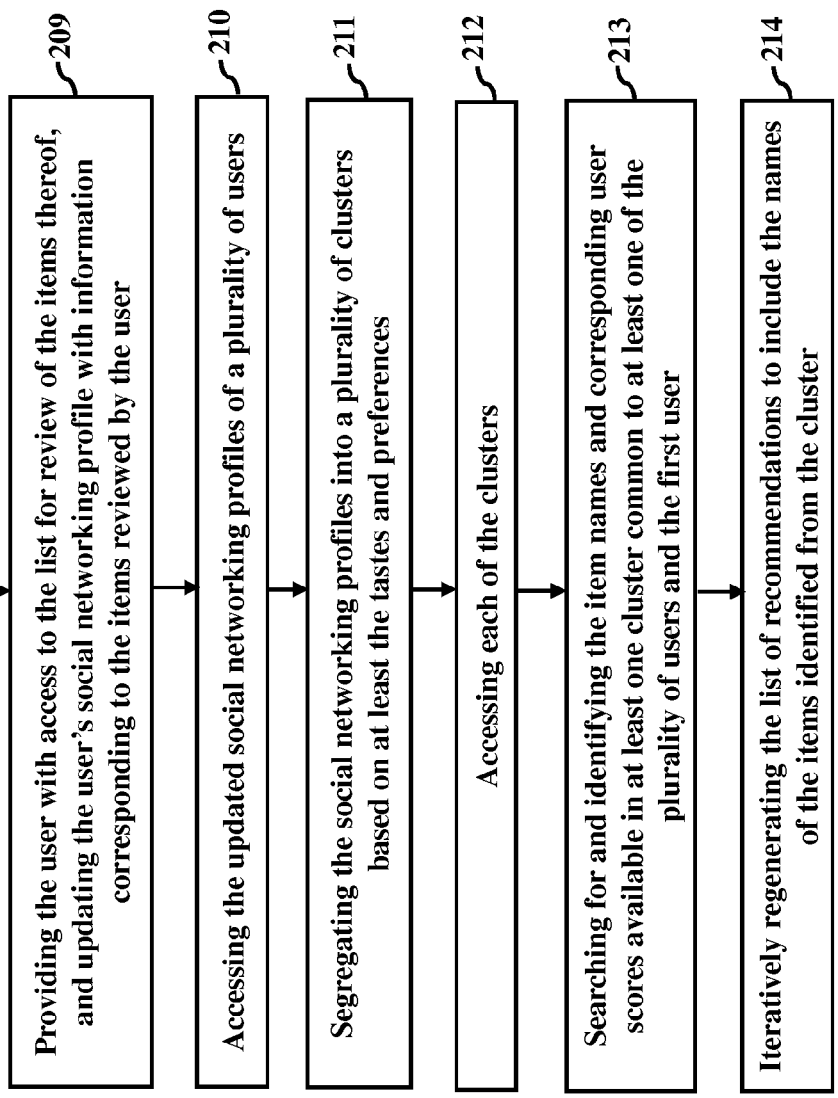
FIG. 3 is a continuation of the flow diagram of FIG. 2 illustrating the steps involved in a computer implemented method for recommending at least one item to a user, in accordance with a second embodiment herein.

FIGS. 2 through 3, with reference to FIGS. 1A through 1D, illustrate the second embodiment herein which is directed to a flowchart illustrating the computer implemented method for generating recommendations corresponding to a plurality of items 7. The method, in accordance with the second embodiment comprises: prompting (201) a first user to input his social network information, and prompting the first user to input at least one item name; prompting (202) the user to review the item corresponding to the input item name, and prompting the user to assign a user score to the item; searching (203) for and eliciting a first group of review score(s), wherein the first group of review score(s) correspond to the item reviewed by the user; searching (204) for and eliciting a second group of review score(s), the second group of review score(s) linked to respective items, and generated only by the reviewer(s) who generated the first group review scores; calculating (205) weight scores corresponding to the combination of user score and each of the review score(s) present in the first group; assigning (206) the weight scores to the respective reviewers and calculating an average weight corresponding to each reviewer; calculating (207) the probability scores for each of the second group of review scores; generating (208) a list having the items linked to the second group of review scores, wherein the list is generated based on at least the probability scores corresponding to each of the items linked to the second group of review scores; providing (209) the user with access to the list for review of the items thereof, and updating the user's social networking profile with information corresponding to the items reviewed by the user; accessing (210) the updated social networking profiles of a plurality of users; segregating (211) the social networking profiles into a plurality of clusters based on at least the tastes and preferences elicited from the respective social networking profiles; accessing (212) each of the clusters; searching (213) for and identifying the item names and corresponding user scores available in at least one cluster common to at least one of the plurality of users and the first user; and iteratively regenerating (214) the list of recommendations to include the names of the items identified by the second search module, and providing the user with access to the regenerated list.

In accordance with the second embodiment, prompting (201) a user to input his social network information further includes prompting the user to enter at least the username and the password. In accordance with the second embodiment, calculating (205) the weight score further includes calculating the weight scores using a function of squares of difference between each of the review scores in the first group and the user score. In accordance with the second embodiment, the method further includes grouping the social networking profiles of users into different clusters based on at least the interests of users, demographic information corresponding to users, tastes and preferences of users.

In accordance with a third embodiment herein, there is provided a non-transitory computer readable medium having computer readable instructions stored thereupon, the computer readable instructions when executed by a processor, cause a computer enabled device to: prompt a user to input his social network information, and prompt the user to input at least one item name; prompt the user to review the item denoted by item name and assign a user score to the item; search for and elicit a first group of review score(s), wherein the first group of review score(s) correspond to the item reviewed by the user; search for and elicit a second group of review score(s), wherein the second group of review score(s) are linked to respective items and are generated by reviewer(s) who generated the first group review scores; calculate weight scores corresponding to the combination of user score and each of the review score(s) available in the first group; assign the weight scores to the respective reviewers; calculate an average weight corresponding to each reviewer based on the weight scores assigned to each of the reviewers; calculate probability scores corresponding to each of the second group of review scores; generate a rank ordered list having the items linked to the second group of review scores, wherein the rank ordered list is generated based on at least the probability scores corresponding to each of the items linked to the second group of review scores; provide the user with access to the rank ordered list for review of the items thereof, and update the user's social networking profile with information corresponding to the items reviewed by the user; accessing the updated social networking profiles of a plurality of users, and segregating the social networking profiles into a plurality of clusters based on at least the tastes and preferences elicited from the respective social networking profiles; access each of the clusters, search for and identify the item names and corresponding user scores available in at least one cluster common to at least one of the plurality of users and the first user; and iteratively regenerate the list of recommendations to include the names of the items identified by the second search module, and provide the user with access to the regenerated list.

In accordance with the third embodiment, the computer readable instructions, when executed by a processor further cause a computer enabled device to prompt the user to enter at least the username and the password of the corresponding social networking profile; calculate the weight scores using a function of squares of difference between each of the review scores in the first group and the user score; and segregate the social networking profiles of users based on at least the interests of users, demographic information corresponding to users, tastes and preferences of users.

Figure 4:
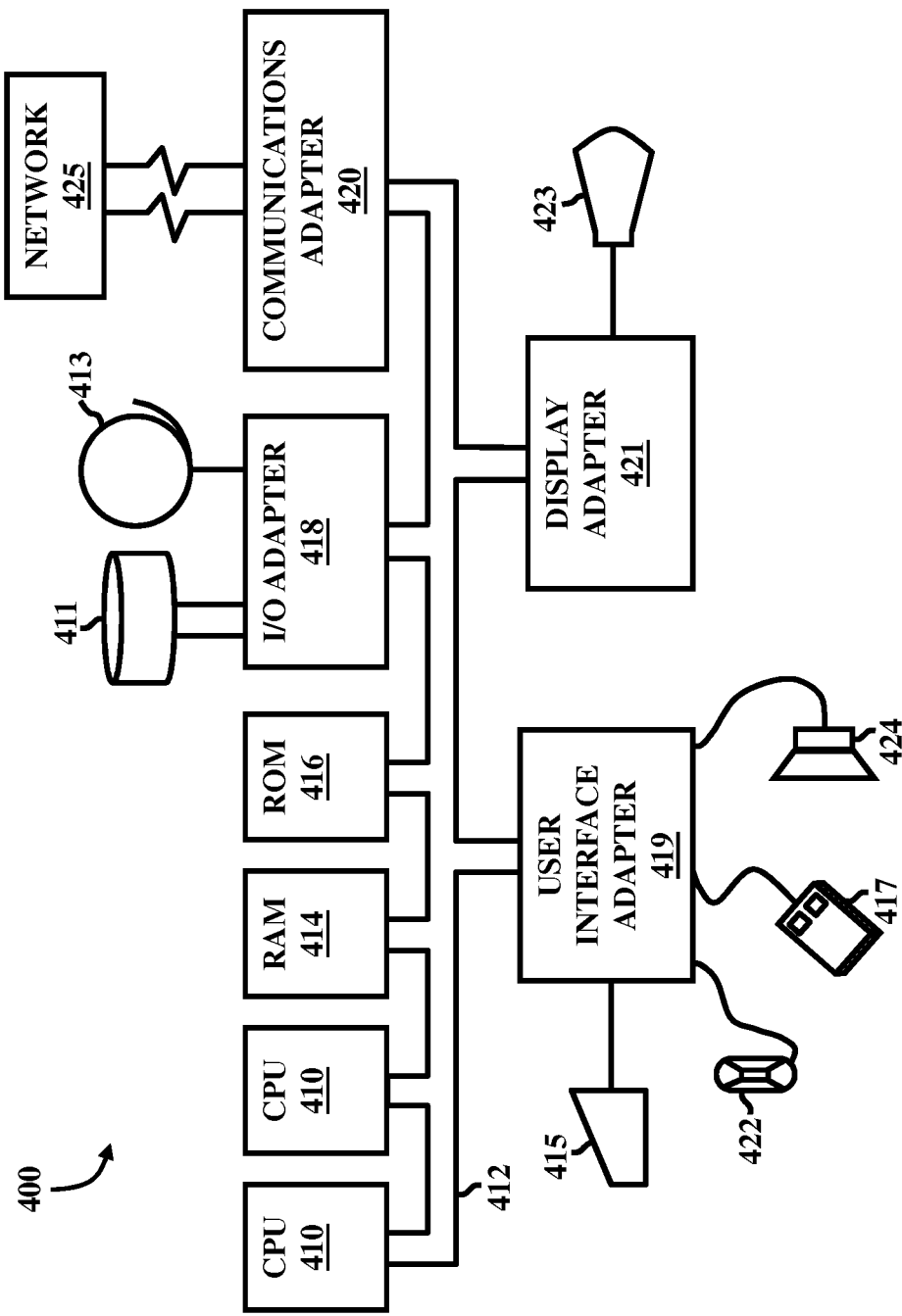
FIG. 4 illustrates a schematic diagram of a computer architecture used in accordance with the embodiments cited herein.

A representative hardware environment for practicing the software embodiments either locally or remotely is depicted in FIG. 4, with reference to FIGS. 1A through 3. This schematic drawing illustrates a hardware configuration of an information handling/computer system 400 in accordance with the embodiments herein. The system 400 comprises at least one processor or central processing unit (CPU) 410. The CPUs 410 are interconnected via system bus 412 to various devices such as a random access memory (RAM) 414, read-only memory (ROM) 416, and an input/output (I/O) adapter 418. The I/O adapter 418 can connect to peripheral devices 411, 413, or other program storage devices that are readable by the system 400. The system 400 can read the inventive instructions on the program storage devices and follow these instructions to execute the methodology of the embodiments herein. The system 400 further includes a user interface adapter 419 that connects a keyboard 415, mouse 417, speaker 424, microphone 422, and/or other user interface devices such as a touch screen device (not shown) to the bus 412 to gather user input. Additionally, a communication adapter 420 connects the bus 412 to a data processing network 425, and a display adapter 421 connects the bus 412 to a display device 423 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A computer implemented system for generating recommendations corresponding to a plurality of items, said system comprising:
a prompter accessible to a first user, wherein said prompter prompts said first user to input social network profile information of said first user, and wherein said prompter prompts said first user to input at least one item name for an item and assign a user score to said item;
a first search module operatively connected to said prompter, wherein said first search module searches for and elicits a first group of at least one review score generated by respective reviewers and corresponding to said item reviewed by said first user, and wherein said first search module searches for and elicits a second group of at least one review score generated only by at least one reviewer who generated said first group of at least one review score;
a processor operatively connected to said first search module, wherein said processor calculates a plurality of weight scores based on said user score and said first group of at least one review score, wherein said processor assigns said plurality of weight scores to said respective reviewers, and calculates an average weight corresponding to each of said respective reviewers, and wherein said processor calculates probability scores corresponding to each item linked to said second group of at least one review score;

a recommendation engine operatively connected to said processor, said recommendation engine comprising:
- a generator that generates a list of recommendations comprising said at least one item name linked to said second group of at least one review score, wherein said list is generated based on at least said probability scores corresponding to each of item linked to said second group of at least one review score, wherein said generator provides said first user with access to said list of recommendations for review of items thereof, and wherein said generator iteratively regenerates said list of recommendations to include only names of said items yet to be reviewed by said first user and linked to said second group of at least one review score; and
- an updating module operatively connected said generator, wherein said updating module updates at least said social network profile information of said first user with information corresponding to items reviewed by said first user;

a clustering module operatively connected to said prompter, wherein said clustering module has access to respective social networking profiles of a plurality of users, said respective social networking profiles being updated by said updating module, and wherein said clustering module segregates said respective social networking profiles of said plurality of users into a plurality of clusters based on at least a taste and preference elicited from said respective social networking profiles; and a second search module operatively connected and cooperating with said clustering module for accessing each of said plurality of clusters, wherein said second search module searches for and identifies said at least one item name and corresponding user scores available in at least one cluster common to at least one of said plurality of users and said first user, and wherein said search module instructs said generator to iteratively regenerate said list of recommendations to include names of items identified by said second search module.

2. The system of claim 1, wherein said prompter prompts said first user to input social network information of said first user including a user name and password for a respective social networking profile.

3. The system of claim 1, wherein said processor calculates said plurality of weight scores using a function of squares of difference between each of said at least one review score in said first group and said user score.

4. The system of claim 1, wherein said prompter instructs said generator to iteratively regenerate said list of recommendations by eliminating from said list of recommendations at least one item that is selected for review by said first user.

5. The system of claim 1, wherein said clustering module groups said respective social networking profiles of said plurality of users into said plurality of clusters based on interests of said first user and demographic information corresponding to said first user.

6. The system of claim 1, wherein said probability scores calculated by said processor are indicative of a probability of said first user preferring each said item present in said second group, and wherein said probability scores are functions of respective said at least one review score present in said second group and an average weight for said respective reviewers.

* * * * *